(12) United States Patent
Hosaka

(10) Patent No.: US 11,219,962 B2
(45) Date of Patent: Jan. 11, 2022

(54) MACHINE TOOL

(71) Applicant: SODICK CO., LTD., Kanagawa (JP)

(72) Inventor: Akio Hosaka, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 307 days.

(21) Appl. No.: 16/676,465

(22) Filed: Nov. 7, 2019

(65) Prior Publication Data

US 2020/0147707 A1 May 14, 2020

(30) Foreign Application Priority Data

Nov. 14, 2018 (JP) .............................. JP2018-213736

(51) Int. Cl.
*B23H 7/26* (2006.01)
*B23H 1/00* (2006.01)

(52) U.S. Cl.
CPC ................ *B23H 7/26* (2013.01); *B23H 1/00* (2013.01)

(58) Field of Classification Search
CPC ................................... B23H 7/26; B23H 1/00
USPC ..................................................... 219/69.11
See application file for complete search history.

(56) References Cited

U.S. PATENT DOCUMENTS

| 6,800,829 B1 * | 10/2004 | Nimmons | B23H 1/00 219/69.11 |
| 8,866,035 B2 * | 10/2014 | Hsu | B23H 7/26 219/69.15 |

FOREIGN PATENT DOCUMENTS

| JP | 3570006 | 9/2004 |
| JP | 3837910 | 10/2006 |

\* cited by examiner

*Primary Examiner* — Brian W Cohen
(74) *Attorney, Agent, or Firm* — JCIPRNET

(57) ABSTRACT

A machine tool includes a ram extending in a longitudinal direction and being disposed horizontally, a processing head attached to the ram, a tower connected to the ram in a state of upwardly standing at an intermediate position in the longitudinal direction of the ram and having an adjustable height, a front arm connected to a front portion of the ram, and a rear arm connected to a rear portion of the ram. The tower includes a base portion fixed to the ram, an arm connection portion connecting the front arm and the rear arm, and a jack-up bolt. The jack-up bolt is in contact with one of the base portion and the arm connection portion in a vertical direction, and threadingly engaged to the other one of the base portion and the arm connection portion. The jack-up bolt pushes the arm connection portion upwardly by screwing or unscrewing.

11 Claims, 16 Drawing Sheets

MACHINE TOOL

CROSS-REFERENCE TO RELATED APPLICATION

This application claims the priority benefit of Japan application serial No. 2018-213736, filed on Nov. 14, 2018. The entirety of the above-mentioned patent application is hereby incorporated by reference herein and made a part of this specification.

BACKGROUND OF THE DISCLOSURE

Technical Field

The disclosure relates to a machine tool. In particular, the disclosure relates to a machine tool which includes a ram extending in a longitudinal direction and being disposed horizontally.

Related Art

As shown in Japanese Patent No. 3837910 and Japanese Patent No. 3570006, a machine tool is known which includes a ram attached with a processing head for holding a tool at one end in a longitudinal direction, and makes the ram travel in the longitudinal direction to change a processing position of the tool. In the specification, the longitudinal direction of the ram, that is a travel direction, is referred to as a front-rear direction. One end portion for holding the tool is referred to as a front end portion, and the other end portion is referred to as a rear end portion. This kind of machine tool has a so-called overhang structure in which the ram protrudes forward with respect to a structural object such as a column, a saddle or the like movably supporting the ram in the front-rear direction.

In a machine tool having an overhang structure, because of a mass of the processing head and an own weight of the ram, the front end portion of the ram is easily deformed to bend downward. In particular, when the machine tool is a sinker electric discharge machine, in addition to the mass of the processing head and the own weight of the ram, a mass of a tool electrode also exerts an influence. In order to broaden a processing region of the machine tool, the overhang structure becomes greater as a travel stroke of the ram in the front-rear direction becomes greater, and the deformation of the ram also becomes noticeable. If the ram is deformed in this way, the processing head including the tool is displaced. A processing precision will be reduced corresponding to an amount of the displacement. If the travel stroke of the ram in the front-rear direction is reduced, the overhang of the ram is reduced and the amount of the displacement is reduced, but reduction of the processing precision is not always completely prevented. In a configuration in which the ram does not travel in the front-rear direction, when an amount of the overhang of the ram is comparatively large, or the mass of the processing head is large, the same problems as described above may also arise.

In order to prevent the deformation, it is also considered to form a ram with high rigidity. However, because the ram is basically formed by cast iron, improvement of the rigidity will increase the weight of the ram. As a result, because of the increased weight, higher rigidity of the ram is required. In addition, if the weight of the ram is increased, for a drive device having a servomotor making the ram travel or the like, a great output is required to ensure a predetermined control response.

In order to prevent the reduction of the processing precision because of the deformation of the ram described above, it is also considered that errors in the processing position in the processing head are eliminated by correction using a software. However, this approach is effective to some extent when the processing head is comparatively light and therefore the ram is comparatively small, but the approach is often ineffective for large machine tools. In addition, because the processing head travels, the correction cannot follow variation of the errors, and it is hard to obtain a high processing precision.

Conventionally, other techniques to prevent the deformation of the ram and reduction of the processing precision because of the deformation of the ram described above are also proposed. For example, in Japanese Patent No. 3837910, a technology is shown in which by arranging several ribs in the ram, increase of the weight of the ram is suppressed, and high rigidity is ensured. In Japanese Patent No. 3570006, a technology is shown in which the rear end portion of the ram is actively deformed by a spring or the like, and the deformation of the front end portion of the ram is offset by the deformation of the rear end portion.

However, although the technology shown in Japanese Patent No. 3837910 can suppress the increase in the weight of the ram, the above conventional problems still cannot be solved fundamentally. The technology shown in Japanese Patent No. 3570006 cannot prevent the deformation of both the front end portion and the rear end portion of the ram.

The embodiments of the disclosure provide a machine tool which can prevent deformation of both a front end portion and a rear end portion of a ram and can be configured to be small and light.

SUMMARY

The machine tool according to an exemplary embodiment of the disclosure includes: a ram which extends in a longitudinal direction and is disposed horizontally; a processing head which is attached to a front surface of the ram; a tower which is connected to an upper surface of the ram in a state of upwardly standing at an intermediate position in the longitudinal direction of the ram and has an adjustable height; a front arm in which one end is connected to a front portion of the ram; and a rear arm in which one end is connected to a rear portion of the ram. The tower includes: a base portion which is fixed to the ram; an arm connection portion to which the other end of the front arm is connected and the other end of the rear arm is connected; and a jack-up bolt having a head arranged in a state of being in contact with one of the base portion and the arm connection portion in a vertical direction, wherein the jack-up bolt is threadingly engaged to the other one of the base portion and the arm connection portion, and upwardly push the arm connection portion by screwing or unscrewing.

BRIEF DESCRIPTION OF THE DRAWINGS

FIG. 3 is a front view partially showing the machine tool viewed along an A-A line in

FIG. 2.

DESCRIPTION OF THE EMBODIMENTS

In the application, connection between the ram, the tower, the front arm and the rear arm means a link in a state that a predetermined tension may act on the front arm and the rear arm. Therefore, for example, the connection may be achieved by engagement between a hook and a convex. The intermediate position refers to a position between the front end and the rear end of the ram. Specifically, a position at which a distance from the front end may be substantially equal to a distance from the rear end, but the position is not particularly limited. The front portion of the ram is a portion between the front end and the center of the ram in a range in which an operational effect of the embodiments of the disclosure to sufficiently pull up the ram can be obtained. For example, in the case of the ram with a general structure made of cast iron, the front portion of the ram refers to a part with a range of up to 20% of the entire length of the ram from the front end toward the center side. Similarly, the rear portion of the ram is a portion between the rear end and the center of the ram in a range in which an operational effect of the embodiments of the disclosure to sufficiently pull up the ram can be obtained. For example, in the case of the ram with a general structure made of cast iron, the rear portion of the ram refers to a part with a range of up to 20% of the entire length of the ram from the rear end toward the center side.

In the machine tool of the exemplary embodiments of the disclosure, the ram is suspended and supported by the tower, the front arm and the rear arm, and the tension which acts to pull up the connected parts of the ram is applied to the front arm and the rear arm. By this configuration, the deformation of the front end portion or the rear end portion of the ram of bending downward can be prevented. In addition, the ram may not be more rigid than necessary, and thus the machine tool of the exemplary embodiments of the disclosure can be configured to be small and light.

Figure 1:
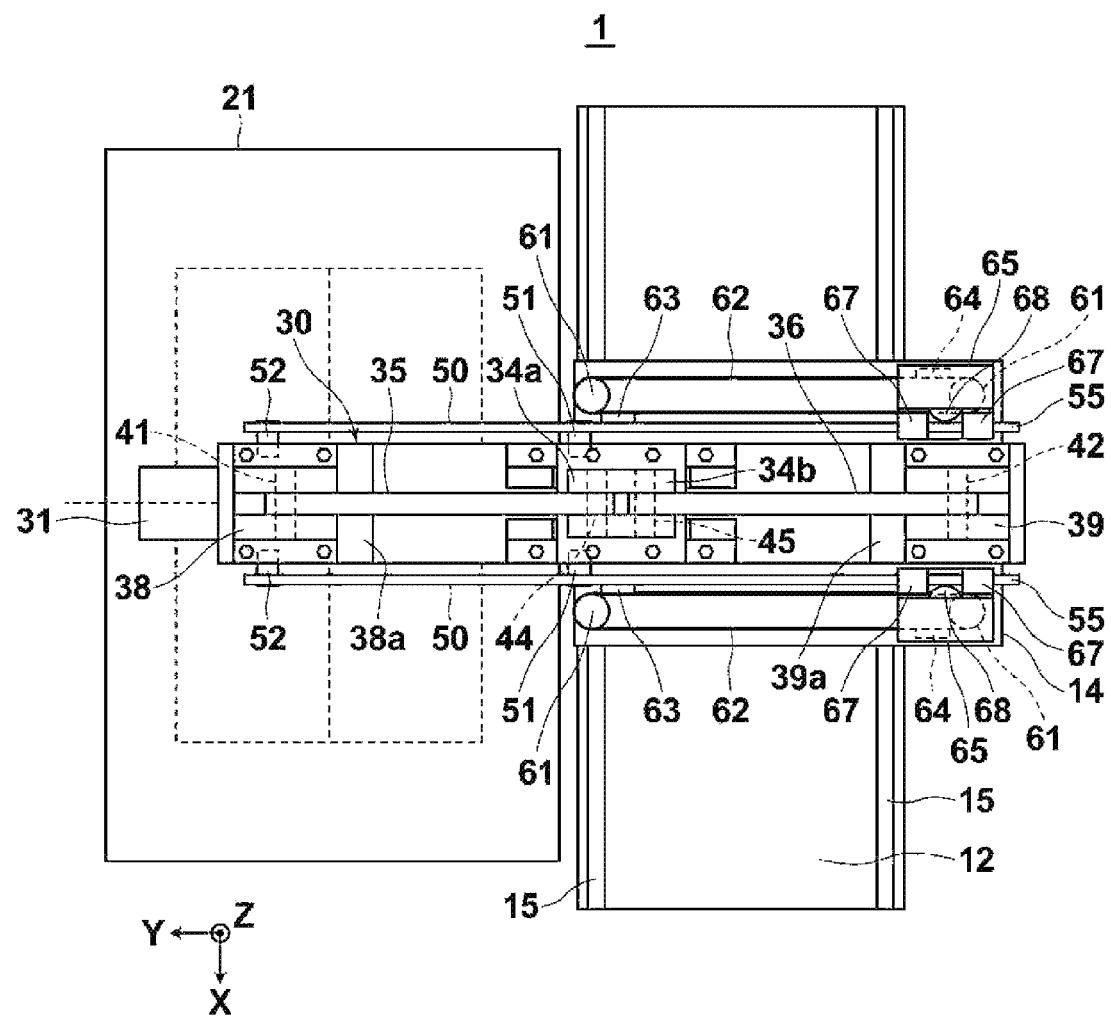
FIG. 1 is a plan view showing a machine tool according to a first embodiment of the disclosure.
Figure 2:
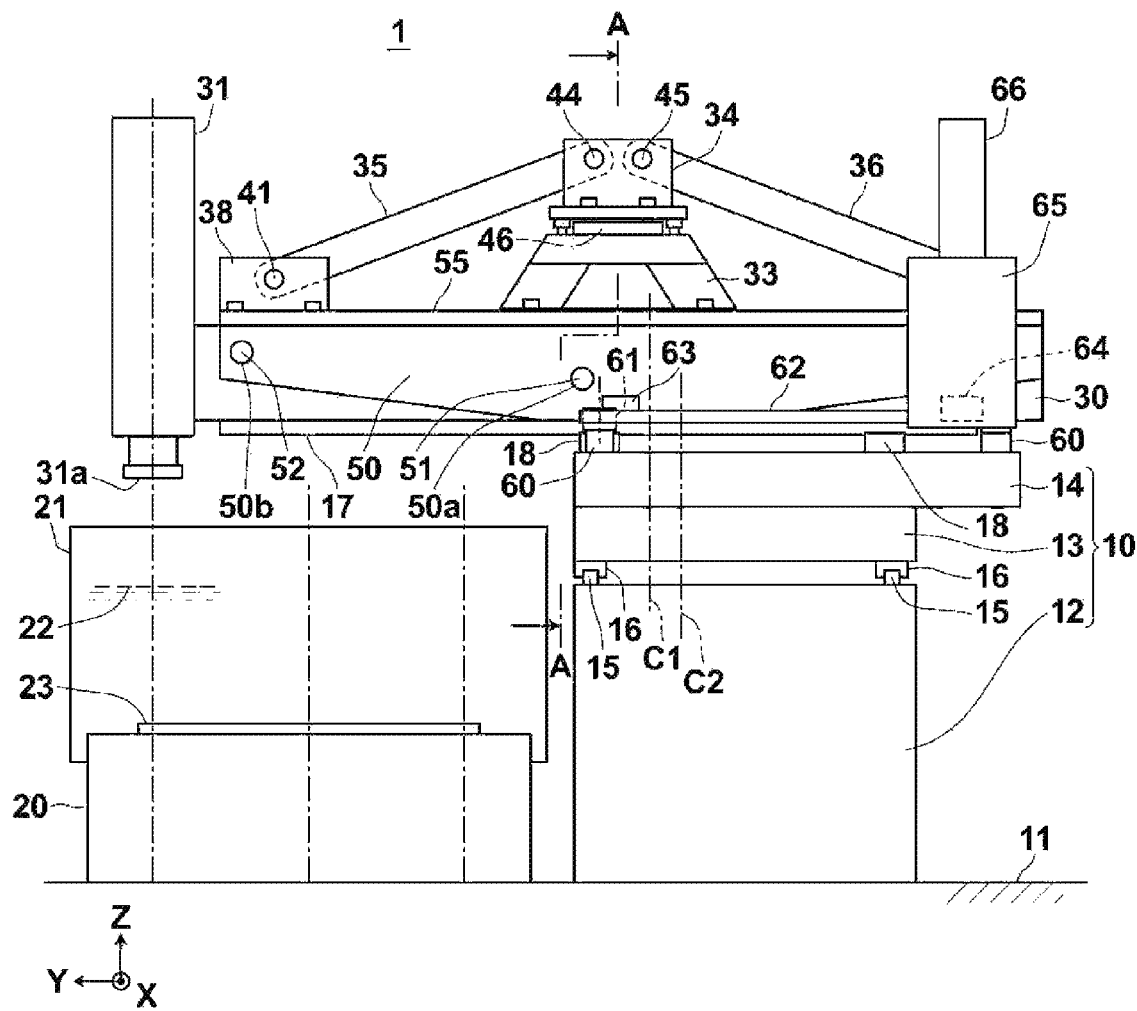
FIG. 2 is a side view showing the machine tool in FIG. 1.
Figure 3:
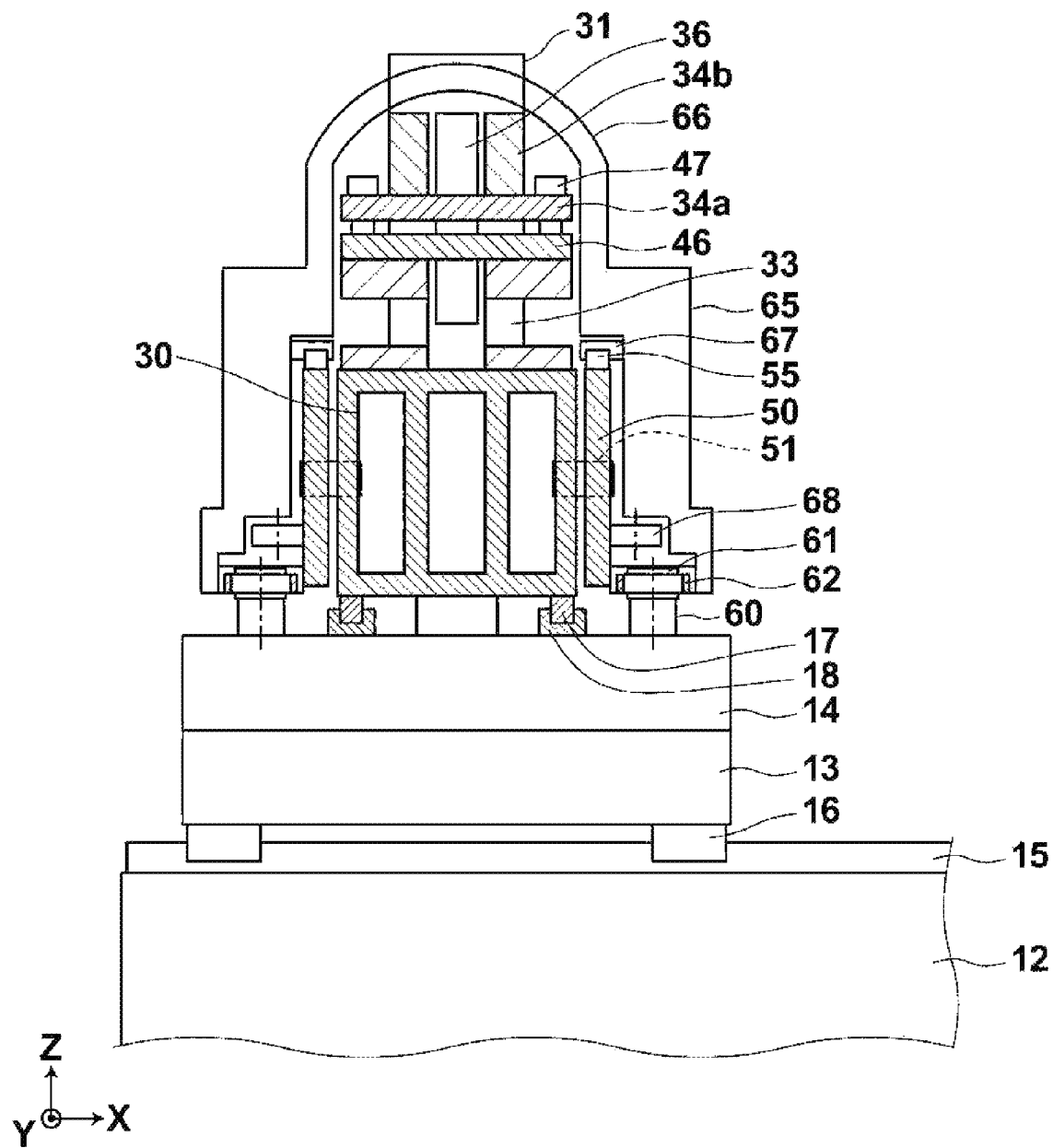

Embodiments of the disclosure are described below with reference to the drawings. A machine tool 1 of a first embodiment shown in FIGS. 1-8 is an electric discharge machine as one example, and includes a structural object 10, a ram 30 mounted on the structural object 10, and rotation members 50 combined with the ram 30. The ram 30 includes long members horizontally disposed. In other words, the ram 30 extends in a longitudinal direction and is disposed horizontally. Furthermore, as shown in FIGS. 1-3, a front-rear direction of the ram 30 is defined as a Y-axis direction. A horizontal direction orthogonal to the Y-axis direction is defined as an X-axis direction. A vertical direction, that is, an up-down direction is defined as a Z-axis direction. With respect to the Y-axis direction, a front end side of the ram 30, that is, an end side of a side for holding a processing head 31 is set as a +Y-axis direction, and a rear end side of the ram 30 is set as a −Y-axis direction.

The structural object 10 includes, for example, a rear bed 12, a slider 13, and a saddle 14. The rear bed 12 being a base is horizontally fixed to a fixing surface 11 such as a factory floor. The slider 13 is disposed on the rear bed 12. The saddle 14 is arranged integrally on the slider 13. Furthermore, a specific configuration of the structural object 10 is not limited to the embodiment. For example, the ram 30 may be directly placed on the rear bed 12. For example, the ram 30 may be placed on the rear bed 12 via a column. On an upper surface of the rear bed 12, for example, two rails 15 extending along the X-axis direction are fixed. Each of the bearings 16 fixed to a lower surface of the slider 13 is engaged to each of these rails 15. By this configuration, the slider 13 can reciprocally travel in the X-axis direction on the rear bed 12.

On a lower surface of the ram 30, for example, two rails 17 extending along the Y-axis direction are fixed. Each of these rails 17 is engaged to each of the bearings 18 fixed to an upper surface of the saddle 14. By this configuration, the ram 30 can reciprocally travel in the Y-axis direction on the saddle 14. The processing head 31 is attached to a front surface of the ram 30. A tool electrode 31a is held at a lower end of the processing head 31 by a holder. The processing head 31 is configured to be capable of making the tool electrode 31a reciprocally travel in the Z-axis direction by an unillustrated driver housed inside the processing head 31.

On a front side of the rear bed 12, a front bed 20 is fixed to the fixing surface 11. A processing tank 21 is supported on the front bed 20. A processing liquid 22 is stored in the processing tank 21, and a workpiece 23 is placed on a table which is arranged on the front bed 20. In this way, electric discharge processing is performed on the workpiece 23 disposed in the processing liquid 22 by the tool electrode 31a which travels in horizontal two-axis directions and a vertical one-axis direction. The travel of an electric discharge processing position in the X-axis direction is performed in a manner that the slider 13 is moved by a driver not shown. The travel of the electric discharge processing position in the Y-axis direction is performed in a manner that the ram 30 is moved by a driver not shown. The travel of the electric discharge processing position in the Z-axis direction is performed in a manner that the processing head 31 is moved by the driver not shown.

Figure 5:
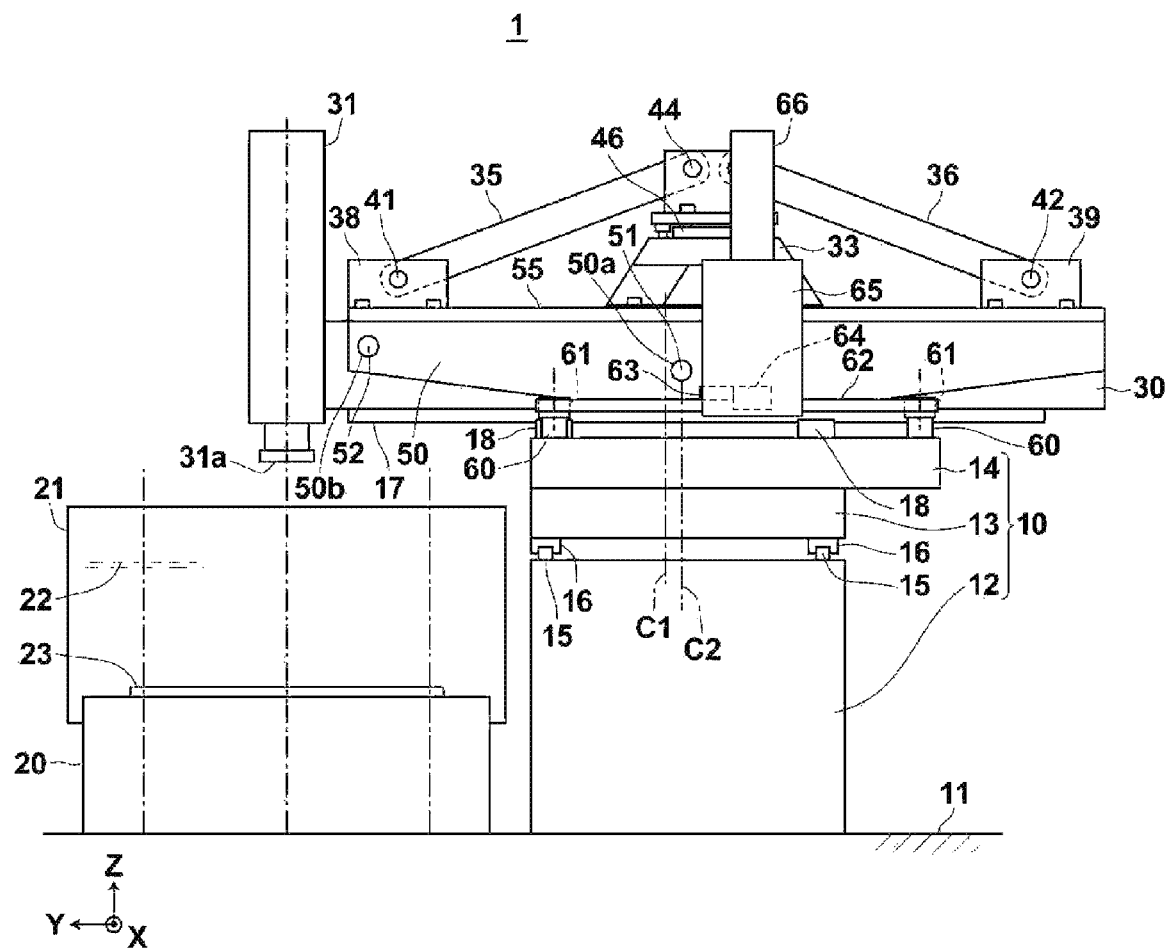
FIG. 5 is a side view showing the machine tool in FIG. 2 in which a ram is moved back to a center of a Y-axis travel distance.
Figure 6:
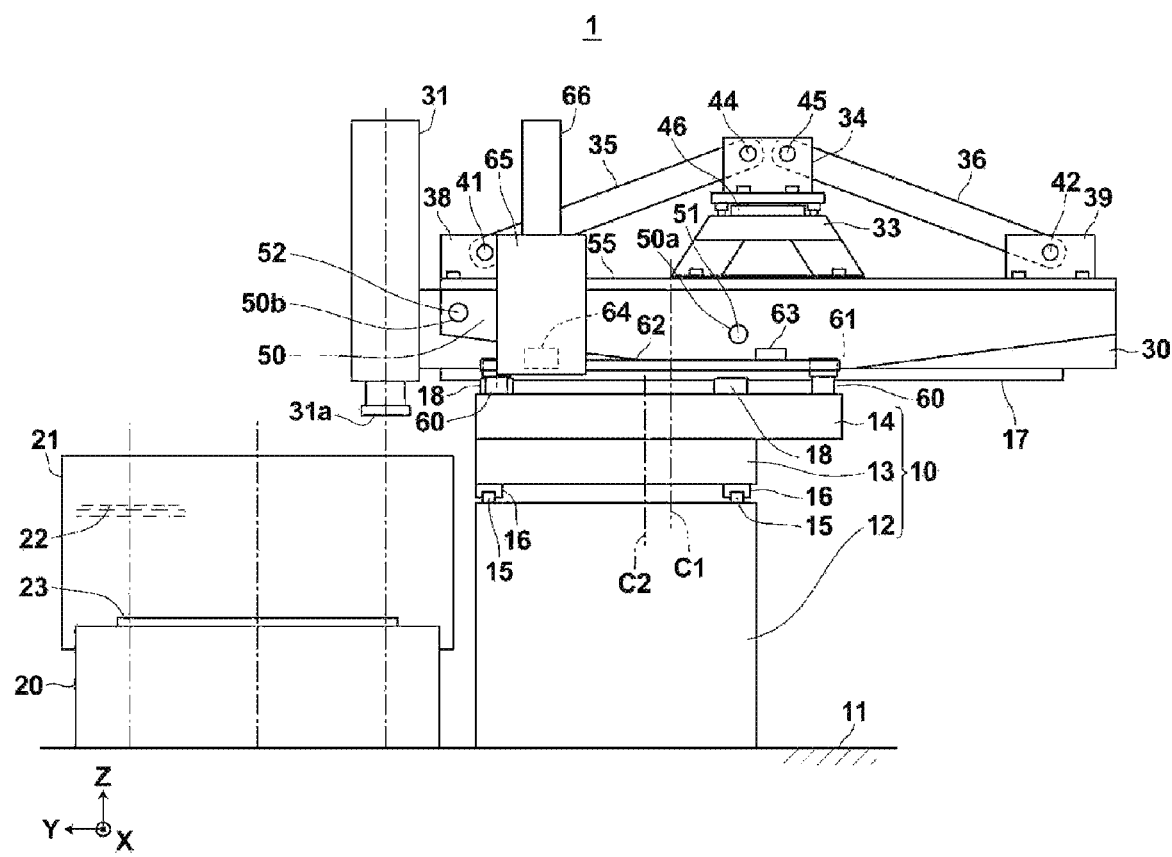
FIG. 6 is a side view showing the machine tool in FIG. 2 in which the ram is moved back to the farthest position in the Y-axis direction.
Figure 7:
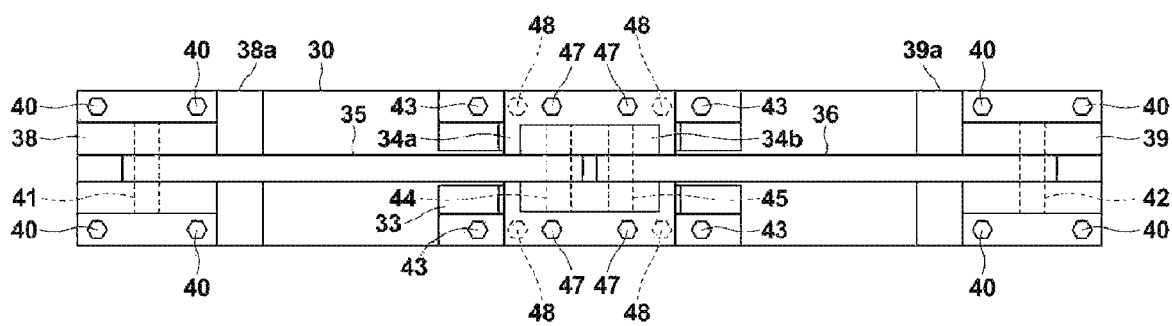
FIG. 7 is a plan view showing main parts of the machine tool in FIG. 1.

FIG. 2 shows the ram 30 having the greatest overhang amount of protruding most forward (that is, +Y direction) with respect to the saddle 14. FIG. 5 shows the ram 30 having a medium overhang amount. FIG. 6 shows the ram 30 having the smallest overhang amount.

Next, a structure in which the ram 30 is pulled up is specifically described with reference to FIGS. 1-8. The ram 30 is a horizontally disposed long member consisting of, for example, cast iron. The ram 30 holds the processing head 31 at a front end portion which is an end portion in the +Y-axis direction. A tower 32 which stands upwardly is fixed to an intermediate position of the longitudinal direction of the ram 30. The intermediate position means a position between a front end and a rear end of the ram 30, and is desirably, but not limited to, a central position at which distances from these two ends are equal.

Figure 8:
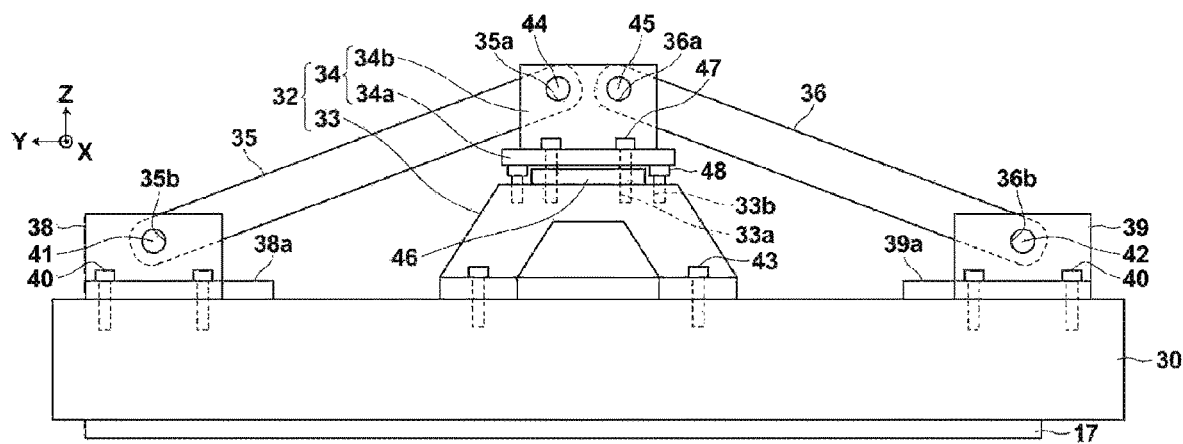
FIG. 8 is a side view showing the main parts of the machine tool in FIG. 1.
Figure 9:
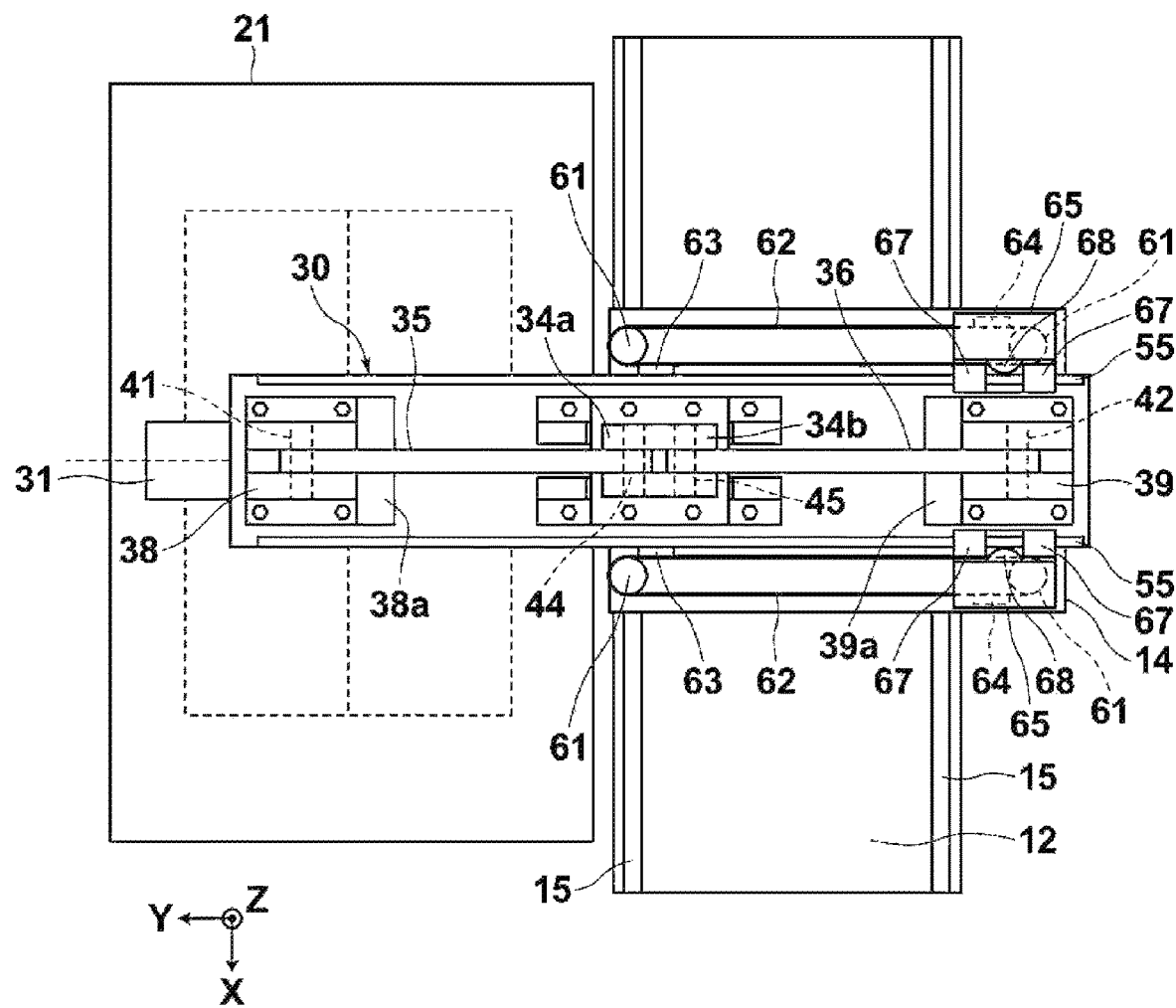
FIG. 9 is a plan view showing a machine tool according to a second embodiment of the disclosure.

As best shown in FIG. 8, the tower 32 having an adjustable height includes, for example, a base portion 33 and an arm connection portion 34. The base portion 33 and the arm connection portion 34 are made of steel for example. The base portion 33 is fixed to the ram 30. The arm connection portion 34 is movably supported by the base portion 33 in the up-down direction on an upper side of the base portion 33. A front arm 35 and a rear arm 36 which are respectively connected to the ram 30 are connected to the arm connection portion 34. The front arm 35 and the rear arm 36 are made of steel for example. One end of the front arm 35 is connected to a front portion of the ram 30. The other end of the front arm 35 is connected to the arm connection portion 34. One end of the rear arm 36 is connected to a rear portion of the ram 30. The other end of the rear arm 36 is connected to the arm connection portion 34. In the embodiments of the disclosure, the front portion of the ram 30 refers to a position closer to the front end of the ram 30 than the center of the ram 30 in a range in which a tension is applied to obtain the operational effect of sufficiently preventing the deformation that the front end portion of the ram 30 is bent downward, the tension acting to pull up a part of the ram 30 to which the tower 32 is connected. In the embodiments of the disclosure, the rear portion of the ram 30 refers to a position closer to the rear end of the ram 30 than the center of the ram 30 in a range in which the tension is applied to obtain the operational effect of sufficiently preventing the deformation that the rear end portion of the ram 30 is bent downward, the tension acting to pull up the part of the ram 30 to which the tower 32 is connected.

More specifically, the base portion 33 is fixed to an upper surface of the ram 30 by a plurality of bolts 43. In addition, the arm connection portion 34 has a bracket 34a which is arranged to extend in the horizontal direction, and two pieces of vertical plates 34b erected in the bracket 34a. An arm upper support shaft 44 extending in the X-axis direction is fixed to the vertical plates 34b. An arm upper support shaft 45 extending in the X-axis direction is fixed to the vertical plates 34b away from the arm upper support shaft 44 backward, that is, toward the −Y-axis direction. By inserting the arm upper support shaft 44 into a circular hole 35a, the other end of the front arm 35 is connected to the arm connection portion 34 to be rotatable around the arm upper support shaft 44. By inserting the arm upper support shaft 45 into a circular hole 36a, the other end of the rear arm 36 is connected to the arm connection portion 34 to be rotatable around the arm upper support shaft 45.

On the other hand, on the upper surfaces of the front portion and the rear portion of the ram 30, a front end side bracket 38 and a rear end side bracket 39 are respectively fixed to the ram 30 by a plurality of bolts 40. An arm lower support shaft 41 extending in the X-axis direction is fixed to the front end side bracket 38. By inserting the arm lower support shaft 41 into a circular hole 35b, the one end of the front arm 35 is connected to the front end side bracket 38 to be rotatable around the arm lower support shaft 41. An arm lower support shaft 42 extending in the X-axis direction is fixed to the rear end side bracket 39. By inserting the arm lower support shaft 42 into a circular hole 36b, the one end of the rear arm 36 is connected to the rear end side bracket 39 to be rotatable around the arm lower support shaft 42. On an inner side of each of the front end side bracket 38 and the rear end side bracket 39, that is, on the central side of the ram 30, a stopper 38a and a stopper 39a are fixed to the upper surface of the ram 30 by welding or the like.

Next, a structure in which the base portion 33 and the arm connection portion 34 are assembled is described. A spacer 46 extending in the horizontal direction is arranged between a lower surface of the bracket 34a of the arm connection portion 34 and an upper surface of the base portion 33. A plurality of circular holes not shown to which bracket fixing bolts 47 are inserted is arranged in the spacer 46 and the bracket 34a. A plurality of the bracket fixing bolts 47 passes through the circular holes from an upper side of the bracket 34a, and bolt portions formed at tip end portions of the bracket fixing bolts 47 are threadingly engaged with and fastened to screw holes 33a of the base portion 33. In this way, the arm connection portion 34 is supported on the base portion 33 via the spacer 46 in a state of not moving in the horizontal direction but being able to move in the vertical direction. A plurality of screw holes 33b is arranged in the base portion 33 on an outer side of the screw holes 33a, that is, on the end portion side of the ram 30. The tower 32 further includes jack-up bolts 48. The jack-up bolts 48 are threadingly engaged with the base portion 33 by the screw holes 33b. Heads of the jack-up bolts 48 are disposed in a state of being in contact with the lower surface of the bracket 34a. In other words, a part of the base portion 33 in which the screw holes 33b are formed supports the jack-up bolts 48 so that the jack-up bolts 48 are screwed or unscrewed.

The heads of the jack-up bolts 48 are formed thinner than the spacer 46. A plurality of jack-up bolts 48 is initially screwed into the screw holes 33b to the maximum extend, and lower surfaces of the heads are in contact with the upper surface of the base portion 33. In this state, the plurality of the jack-up bolts 48 is upwardly unscrewed uniformly. As a result, the plurality of jack-up bolts 48 upwardly pushes the bracket 34a to form a space between the lower surface of the bracket 34a and the upper surface of the base portion 33.

Here, when the arm connection portion 34 is at a predefined height position, required appropriate tension is applied to the front arm 35 and the rear arm 36 respectively. Therefore, when the arm connection portion 34 is pushed to a position higher than the above predefined height position, the spacer 46 which is made in advance with a predefined thickness to match the above predefined height is inserted into the space formed between the lower surface of the bracket 34a and the upper surface of the base portion 33. Next, the plurality of jack-up bolts 48 is tightened again until the initial state in which the lower surfaces of the heads of the plurality of jack-up bolts 48 are in contact with the upper surface of the base portion 33, and the lower surface of the bracket 34a come into contact with the upper surface of the base portion 33 across the spacer 46. Then, the plurality of bracket fixing bolts 47 is fastened, and the arm connection portion 34 is completely fixed. As is clear from the above description, the plurality of jack-up bolts 48 and one part of the base portion 33 in which the screw holes 33b are formed are configured as a means for applying the tension to the front arm 35 and applying the tension to the rear arm 36. In addition, in the embodiment, the tower 32 includes the spacer 46. The spacer 46 is arranged between the arm connection portion 34 and the base portion 33 and comes into contact with the arm connection portion 34 and the base portion 33 when the tension is applied. Thereby, load applied to the jack-up bolts 48 and the screw holes 33b is reduced.

Furthermore, the means for applying a tension to the front arm 35 and the means for applying a tension to the rear arm 36 are not limited to the above-described configuration, and may be configured separately from each other. The number of the jack-up bolts 48 may be one or more as long as the tension can be applied to the front arm 35 and the rear arm 36. In the embodiment, the jack-up bolts 48 are arranged in a state that the heads are in contact with the base portion 33 in the vertical direction; however, the jack-up bolts 48 may also be arranged in a state that the heads are in contact with the arm connection portion 34, more specifically, the bracket 34a in the vertical direction. That is, the screw holes for threadingly engaging the jack-up bolts 48 may be formed in the arm connection portion 34, specifically, the bracket 34a. Members which are threadingly engaged with the jack-up bolts 48 to screw the jack-up bolts 48 may be nuts. That is, when the heads of the jack-up bolts 48 are arranged to be in contact with the base portion 33, the nuts are arranged to face the heads of the jack-up bolts 48 across the base portion 33. When the heads of the jack-up bolts 48 are arranged to be in contact with the arm connection portion 34, specifically, the bracket 34a, the nuts are arranged to face the heads of the jack-up bolts 48 across the arm connection portion 34, specifically, the bracket 34a. In the application, "threadingly engaged with the base portion 33 or the arm connection portion 34" includes not only a state of being directly threadingly engaged with the screw holes or the like formed in the base portion 33 or the arm connection portion 34, but also a state of being indirectly threadingly engaged via the nuts or the like.

As described above, the ram 30 consisting of cast iron is suspended and supported by the tower 32, the front arm 35 and the rear arm 36, and the tension which acts to pull up the connected parts of the ram 30 is applied to the front arm 35 and the rear arm 36, and thereby the front end portion or the rear end portion of the ram 30 is prevented from being deformed to bend downward. Particularly, in the embodiment, as shown in FIG. 2, the ram 30 can take a position where the ram 30 is greatly overhung with respect to the structural object 10 such as the saddle 14. In this state, a part close to the front end of the ram 30 is deformed easily, and thus being able to prevent this deformation is very effective in improving precision of the electric discharge processing. In addition, the machine tool 1 of the embodiment is not configured in a manner that the ram 30 itself has particularly high rigidity, and thus the machine tool 1 can be configured to be small and light. Particularly, by disposing the arm lower support shaft 41 arranged in the front portion of the ram 30 to a position as high as possible, not only the deformation amount of the ram 30 is reduced, but also the ram 30 can be pulled up in a manner that the front end portion of the ram 30 is in a state closer to being horizontal. Thereby, inclination of the processing head 31 is reduced, and the processing precision can be further improved.

In order to prevent the deformation of the ram 30, it is also considered that the ram 30 itself is configured to have high rigidity. However, in this case, the ram 30 is more easily deformed because of its own weight increase, and thus it is necessary to take further measures to prevent deformation. As a result, further enlargement and weight increase of the ram 30 and the whole of the machine tool 1 are caused. Particularly, the machine tool 1 of the embodiment is configured to make the processing head 31 travel in three axial directions, and thus if the ram 30 becomes heavy, it is hard to keep a high positioning precision of the travel of the processing head 31, that is, a high precision of electric discharge processing.

In the embodiment, the front arm 35 and the rear arm 36 are configured by steel material which has a Young's modulus greater than a Young's Modulus of the cast iron configuring the ram 30. For example, a Young's modulus of gray cast iron is 100 GPa, and a Young's modulus of rolled steel material (for example, SS400, which is regulated by Japanese Industrial Standards) is 206 GPa. If the front arm 35 and the rear arm 36 are configured by the aforementioned material, the front arm 35 and the rear arm 36 are lighter and more rigid, which is advantageous in preventing the deformation of the ram 30.

Figure 4:
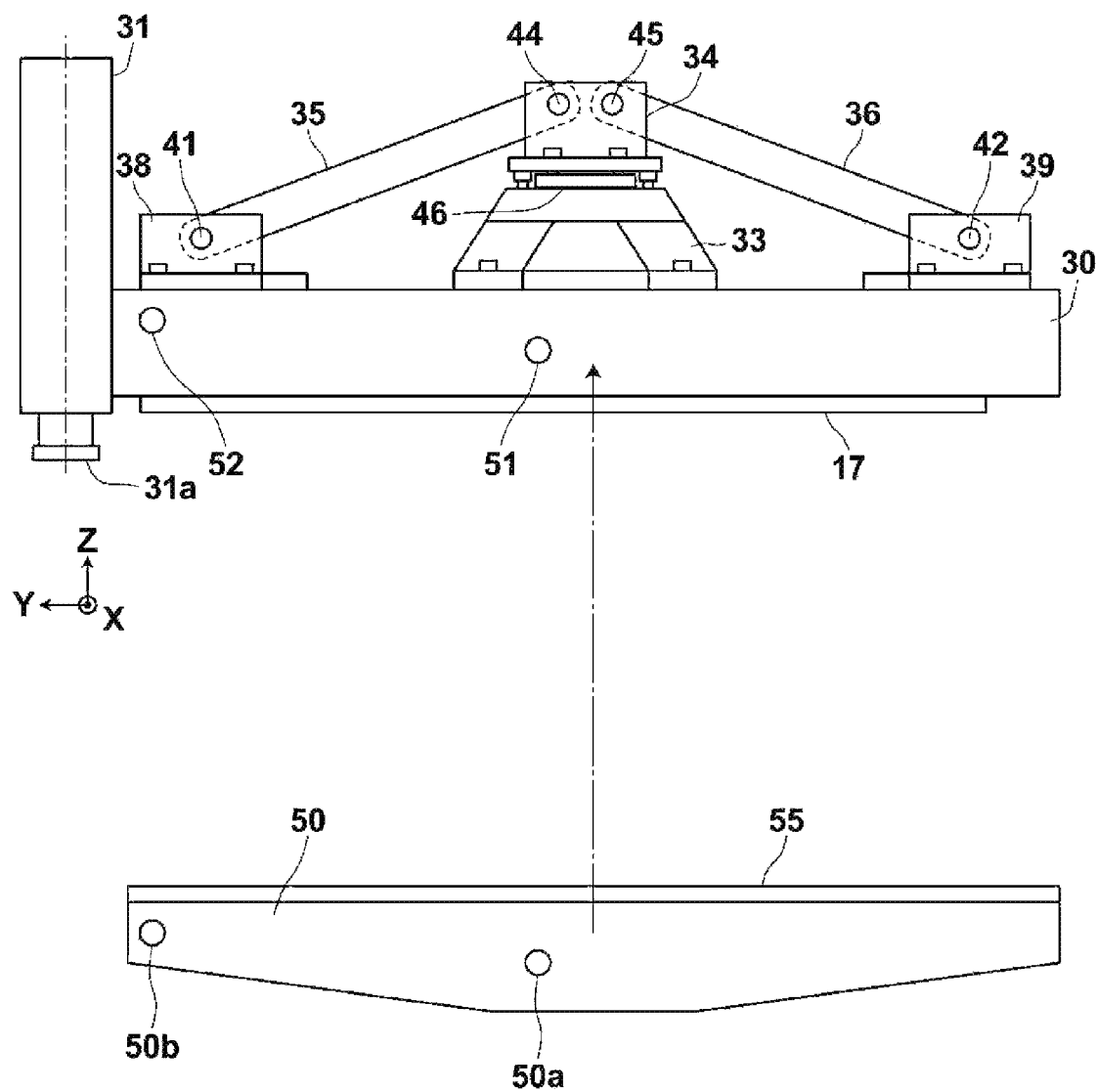
FIG. 4 is a side view showing one portion of the machine tool in FIG. 1.

Next, the rotation members 50 and the surrounding of the rotation members 50 are specifically described. The rotation members 50 which are formed into a plate shape are arranged on both the left and right sides with respect to the ram 30, that is, one piece of rotation member 50 is disposed on each of the +X side and the −X side. Each rotation member 50 has, as also shown in FIG. 4, a circular first shaft hole 50a and a circular second shaft hole 50b. On the other hand, cylindrical first shafts 51 extending in the X-axis direction and cylindrical second shafts 52 extending in the X-axis direction are fixed to the ram 30. Besides, the rotation members 50 are combined with the ram 30 by inserting the first shafts 51 into the first shaft holes 50a and inserting the second shafts 52 into the second shaft holes 50b in a loose state. Furthermore, the first shafts 51 or the second shafts 52 may be arranged in the rotation members 50, and the first shaft holes 50a or the second shaft holes 50b may be arranged in the ram 30. Preferably, the first shaft holes 50a or the first shafts 51 are arranged at the intermediate position of the ram 30, and the second shaft holes 50b or the second shafts 52 are arranged at the front portion of the ram 30.

At positions corresponding to the left and right outer sides of each rotation member 50, bearing portions 60 for driving balance weights 65 and pulleys 61 mounted on the bearing portions 60 are arranged apart from each other in the Y-axis direction on the saddle 14 of the structural object 10. Besides, endless belts 62 wrap around two pulleys 61. In this way, between the two pulleys 61, two parts of one endless belt 62 extend away from each other in the X-axis direction. One part of these two parts which is closer to the rotation members 50 is connected to the rotation members 50 via first connection portions 63, and the other part which is farther from the rotation members 50 is connected to the balance weights 65 via second connection portions 64.

The balance weights 65 are respectively arranged on the outer sides of each rotation member 50. Furthermore, in FIG. 1, the balance weights 65 are shown cut along a horizontal plane, and hatching is not applied in order to avoid complication of the drawing. The two balance weights 65 are connected and integrated by a connection member 66 bridged to respective upper portions of the balance weights 65. Rails 55 are respectively fixed to an upper surface of each rotation member 50, and each balance weight 65 is travelable along the rails 55. The upper portion of each balance weight 65 protrudes slightly toward the rotation member 50, and bearings 67 which are attached to lower surfaces of the upper portions of the balance weights 65 are engaged with the rails 55. Wheels 68, which are made of rubber or the like and are in contact with the rotation members 50 from the lateral outer sides, are held in respective balance weights 65 to be capable of rotating around a vertical rotation axis. The wheels 68 restrict positions of the balance weights 65 in the X-axis direction.

As described above, corresponding to the change of the electric discharge processing position in the workpiece 23, the position of the ram 30 in the Y-axis direction with respect to the structural object 10, more specifically, with respect to the saddle 14, is changed as shown in FIG. 2, FIG. 5 and FIG. 6. At this time, movement of the ram 30 is transmitted to the endless belts 62 via the rotation members 50 and the first connection portions 63, and the endless belts 62 are rotated. The rotation of the endless belts 62 is further transmitted to the balance weights 65 via the second connection portions 64, and the balance weights 65 travel in the Y-axis direction. In the endless belts 62, parts to which the first connection portions 63 are connected and parts to which the second connection portions 64 are connected travel to directions opposite to each other in the Y-axis direction. Therefore, as the position of the ram 30 in the Y-axis direction travels in the −Y direction, the balance weights 65 sequentially travel in the +Y direction.

The balance weights 65 travel more backward (−Y direction) as the ram 30 travels more forward (+Y direction) with respect to the structural object 10. Furthermore, the bearing portions 60, the pulleys 61, the endless belts 62, the first connection portions 63 and the second connection portions 64 configure a balance weight driver which makes the balance weights 65 travel as described above. Because the heavy processing head 31 is attached to the front surface of the ram 30, the front end portion of the ram 30 is deformed easily to bend downward as the amount of the overhang by which the ram 30 protrudes further forward than the structural object 10 increases.

However, according to the configuration of the embodiment, when the balance weights 65 are positioned closer to the rear end side (the −Y side) of the ram 30 than the first shafts 51, a moment acts to rotate the rotation members 50 around the first shafts 51 in a clockwise direction in FIG. 2. This moment increases as the above amount of the overhang of the ram 30 increases. If the moment acts on the rotation members 50, front end portions of the rotation members 50 apply upward forces to the ram 30 via the second shaft holes 50b and the second shafts 52. In this way, the front end portion of the ram 30 is pulled up and prevented from being deformed to bend downward.

In addition, from a point other than the above moment, even if the overhang of the ram 30 occurs, the deformation of the ram 30 can be suppressed to be smaller. The point is described below specifically. Here, a structure above the bearings 16 which applies load to the rails 15 is set as an X-axis direction traveling body. In FIG. 2, FIG. 5 and FIG. 6, a position of the center of gravity in the Y-axis direction of a structure in which the balance weights 65, the bearings 67 and the wheels 68 associated with the balance weights 65, and the connection members 66 are excluded from the X-axis direction traveling body is indicated by a one-dot chain line C1. A position of the center of gravity in the Y-axis direction of the X-axis direction traveling body is indicated by a one-dot chain line C2.

As known from comparison of the above two positions of the center of gravity, by arranging the traveling balance weights 65 and the connection members 66, compared with a case without the balance weights 65 and the connection members 66, the position of the center of gravity of the X-axis direction traveling body is positioned closer to the center than two traveling body supporting positions separated in the Y-axis direction, that is, positions between two rails 15. In this case, when the overhang of the ram 30 occurs, load applied to parts outside the two traveling body supporting positions is reduced, and the deformation of the ram 30 can be prevented more reliably.

When the overhang of the ram 30 occurs, in order to reduce the load applied to the parts outside the above two traveling body supporting positions, a width of the rear bed 12, that is, a dimension in the Y-axis direction of the rear bed 12 may be increased to set a greater interval between the two traveling body supporting positions. However, if the position of the center of gravity of the X-axis direction traveling body is positioned, as described above, closer to the center than the two traveling body supporting positions separated in the Y-axis direction, a smaller width of the rear bed 12 can be configured, and thus it is advantageous in making the machine tool 1 small and light.

An exemplary weight of the balance weights 65 is described below. A weight of a Y-axis direction traveling body excluding the balance weights 65 is set as W1, and the weight of the balance weights 65 is set as W2. Here, the bearings 67 and the wheels 68 associated with the balance weights 65 and the connection members 66 are not considered. In order to prevent the center of gravity from moving forward and prevent the ram 30 from tilting because of application of counter balance to the ram 30 moving forward, it is clear that at least a position of the center of gravity of the entire traveling body including the balance weights 65 and the Y-axis direction traveling body which is calculated by a sum of the weight W1 and the weight W2 is required to be positioned behind the position of the bearing 18 disposed in a front side. At this time, the weight W2 of the balance weights 65 to be applied may be as small as possible so as not to unnecessarily increase the weight of the entire traveling body. On the other hand, the weight W2 also needs to be large enough to be capable of applying balance. Therefore, it is sufficient that the weight W2 is ⅓ to ½ of the weight W1 if the weight W1 is set as 1 in relative ratio to the weight W2.

With reference to FIGS. 9-13, a machine tool 2 according to a second embodiment of the disclosure is described. In FIGS. 9-13, the same elements as those in the drawings according to the first embodiment are added with the same reference symbols, and description thereof is omitted. A machine tool 2 of the embodiment is also an electric discharge machine as one example, and is basically different in not having the rotation members 50 when compared with the machine tool 1 of the first embodiment. Besides, a ram 30 is formed to be slightly wider than the first embodiment, and two rails 55 are attached to an upper surface of the ram 30.

Figure 10:
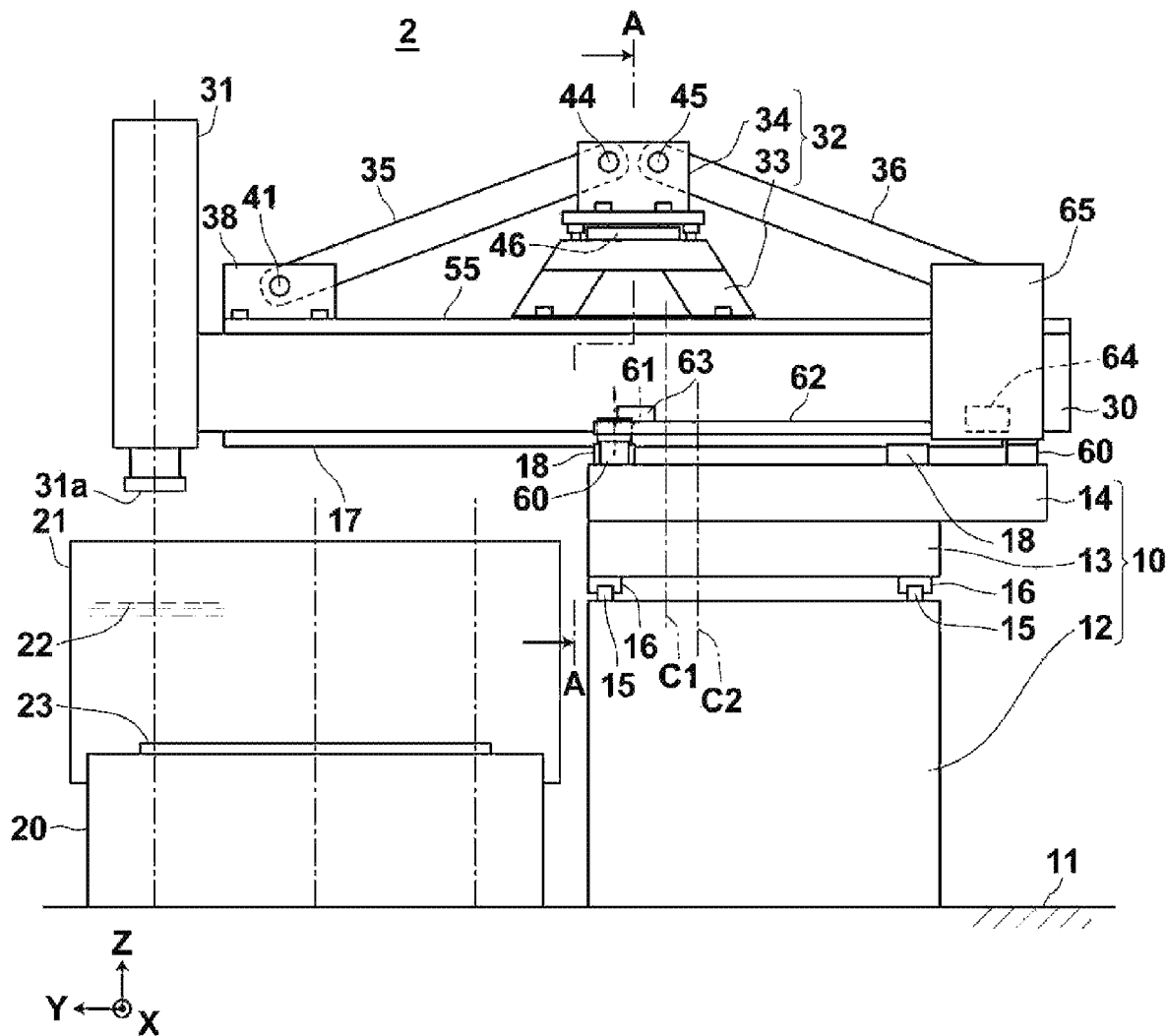
FIG. 10 is a side view showing the machine tool in FIG. 9.
Figure 11:
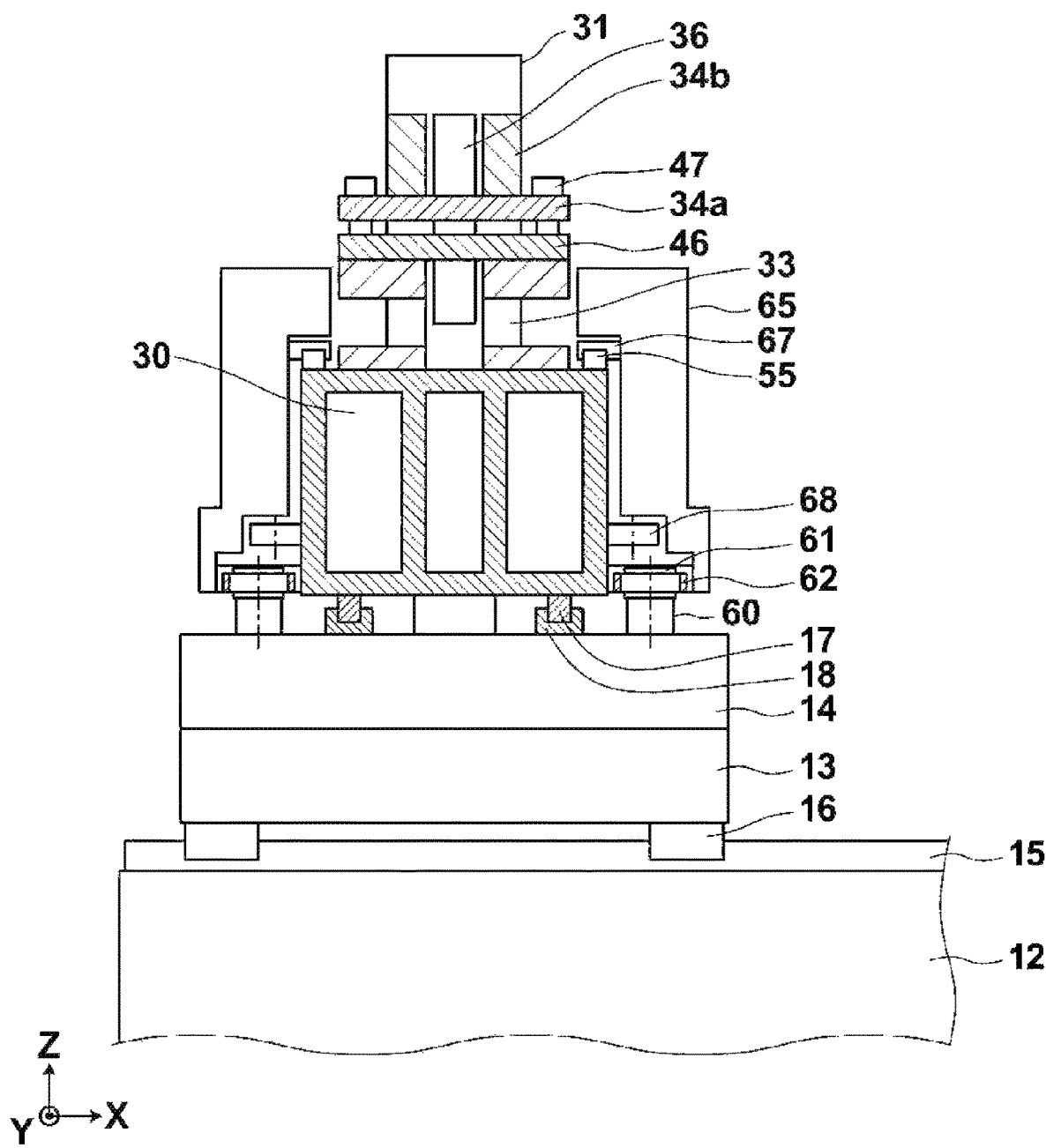
FIG. 11 is a front view partially showing the machine tool viewed along an A-A line in FIG. 10.

In the machine tool 2 of the embodiment, the ram 30 consisting of cast iron is also suspended and supported by a tower 32, a front arm 35 and a rear arm 36 which are made of steel. Besides, a configuration is employed in which a tension which acts to pull up connected parts of the ram 30 is applied to the front arm 35 and the rear arm 36. Thereby, a front end portion or a rear end portion of the ram 30 can be prevented from being deformed to bend downward. Particularly, in the embodiment, as shown in FIG. 10, the ram 30 can take a position where the ram 30 is greatly overhung with respect to a saddle 14 of a structural object 10. In this state, the front end portion of the ram 30 is deformed easily, and thus being able to prevent this deformation is very effective in improving precision of electric discharge processing. In addition, the machine tool 2 of the embodiment is not configured in a manner that the ram 30 itself has a particularly high rigidity, and thus the machine tool 3 can be configured to be small and light.

Balance weights 65 are combined with each of two rails 55 to be travelable along the rails 55 via bearings 67. Besides, at positions corresponding to the left and right outer sides of the ram 30, bearing portions 60 and pulleys 61 mounted on the bearing portions 60 are arranged apart from each other in the Y-axis direction on the saddle 14 of the structural object 10. In addition, endless belts 62 wrap around two pulleys 61. In this way, between the two pulleys 61, two parts of one endless belt 62 extend away from each other in the X-axis direction. One of these two belt parts which is closer to the ram 30 is connected to the ram 30 via a first connection portion 63, and the other part which is farther from the ram 30 is connected to the balance weights 65 via a second connection portion 64.

Figure 12:
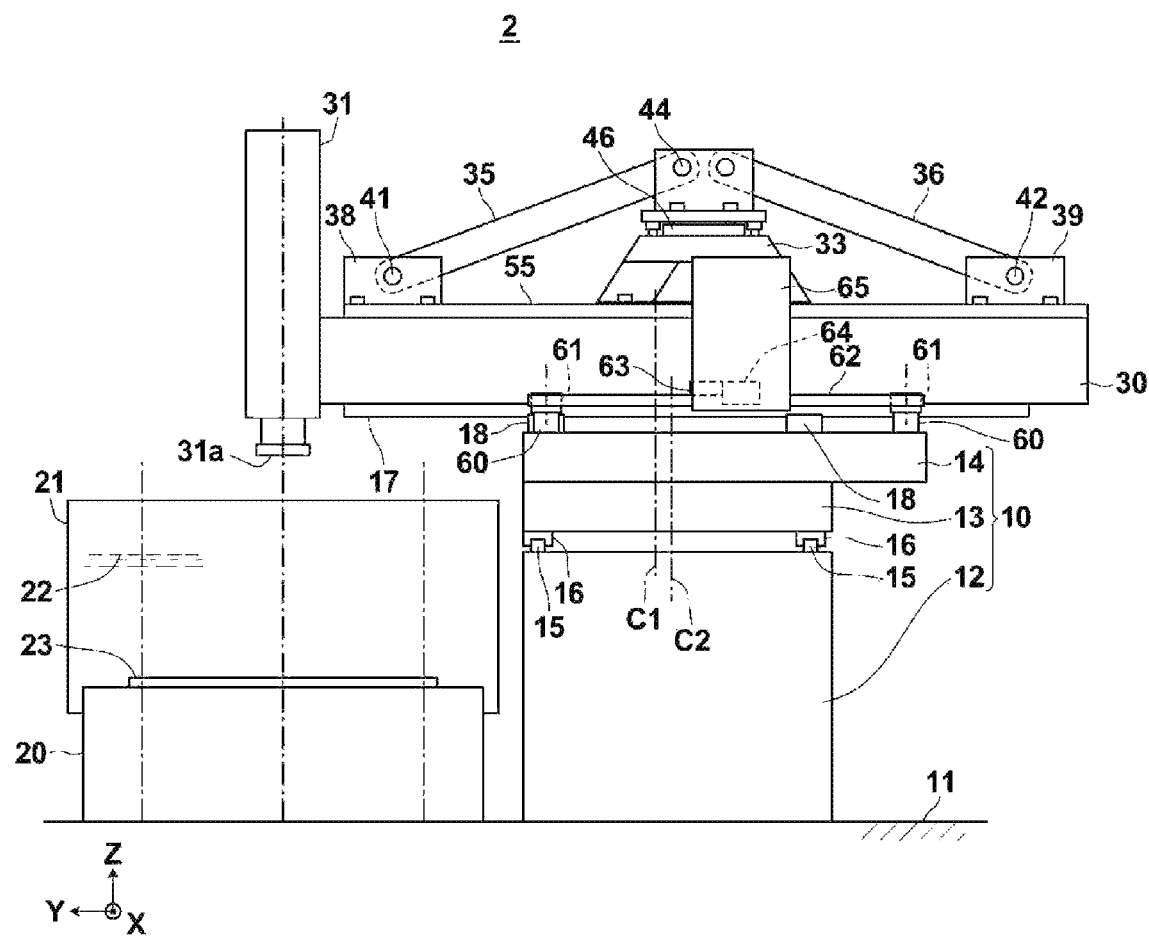
FIG. 12 is a side view showing the machine tool in FIG. 10 in which a ram is moved back to a center of a Y-axis travel distance.
Figure 13:
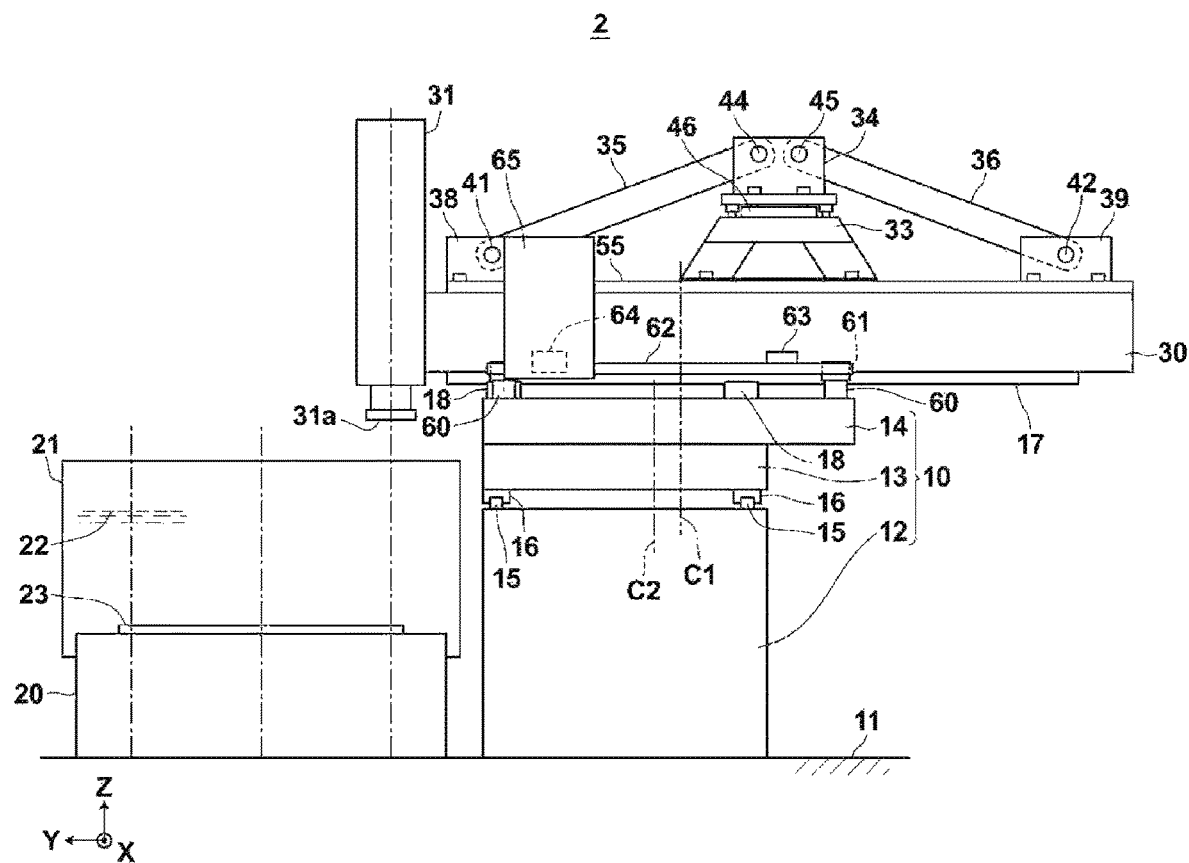
FIG. 13 is a side view showing the machine tool in FIG. 10 in which the ram is moved back to the farthest position in the Y-axis direction.
Figure 14:
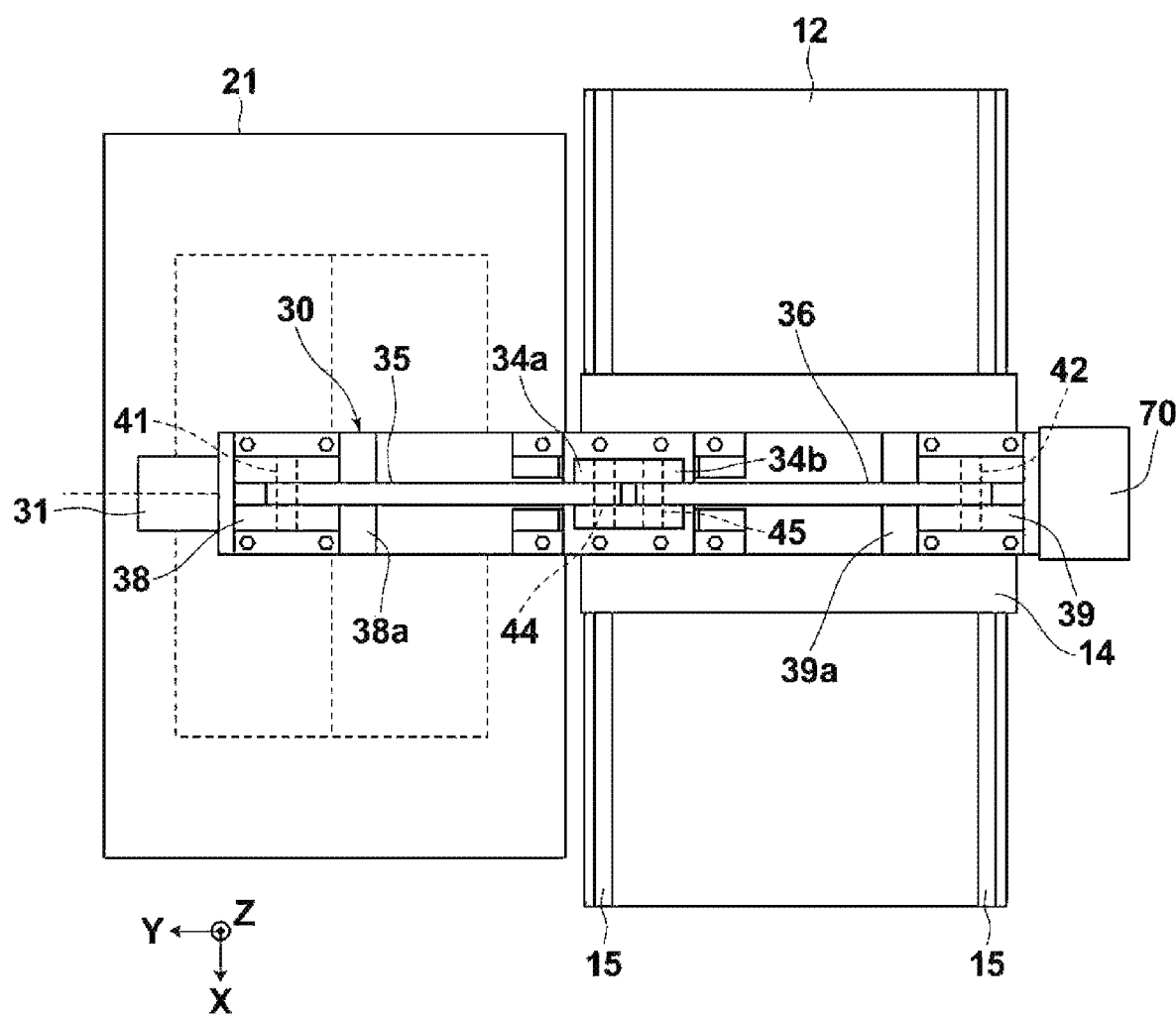
FIG. 14 is a plan view showing a machine tool according to a third embodiment of the disclosure.

In the machine tool 2 of the embodiment having the above configuration, corresponding to the electric discharge processing position in a workpiece 23, the position of the ram 30 in the Y-axis direction with respect to the structural object 10, more specifically, with respect to the saddle 14, is also changed sequentially as shown in FIG. 10, FIG. 12 and FIG. 13. As the ram 30 travels in the −Y direction, the balance weights 65 sequentially travel in the +Y direction. That is, in the embodiment, the balance weights 65 travel more backward (−Y direction) as the ram 30 travels more forward (+Y direction) with respect to the structural object 10. Furthermore, in FIG. 10, FIG. 12 and FIG. 13, a position of the center of gravity in the Y-axis direction of a structure in which the balance weights 65 and the bearings 67 and wheels 68 associated with the balance weights 65 are excluded from an X-axis direction traveling body which applies load to the rails 15 is indicated by a one-dot chain line C1. A position of the center of gravity in the Y-axis direction of the X-axis direction traveling body is indicated by a one-dot chain line C2.

By making the balance weights 65 travel as describe above, similar to the first embodiment, compared with a case without the balance weights 60, the position of the center of gravity of the X-axis direction traveling body is positioned closer to the center than two traveling body supporting positions separated in the Y-axis direction, that is, positions between two rails 15. In this case, when the overhang of the ram 30 occurs, load applied to parts outside the two traveling body supporting positions is reduced, and the deformation of the ram 30 can be prevented.

With reference to FIGS. 14-18, a machine tool 3 according to a third embodiment of the disclosure is described. In FIGS. 14-18, the same elements as those in the drawings according to the first embodiment and the second embodiment are added with the same reference symbols, and description thereof is omitted. The machine tool 3 of the embodiment is also an electric discharge machine as one example, and is basically different in that a configuration for moving the balance weights is omitted and a balance weight 70 is fixed to a rear end of a ram 30, when compared with the machine tool 2 of the second embodiment described above.

Figure 15:
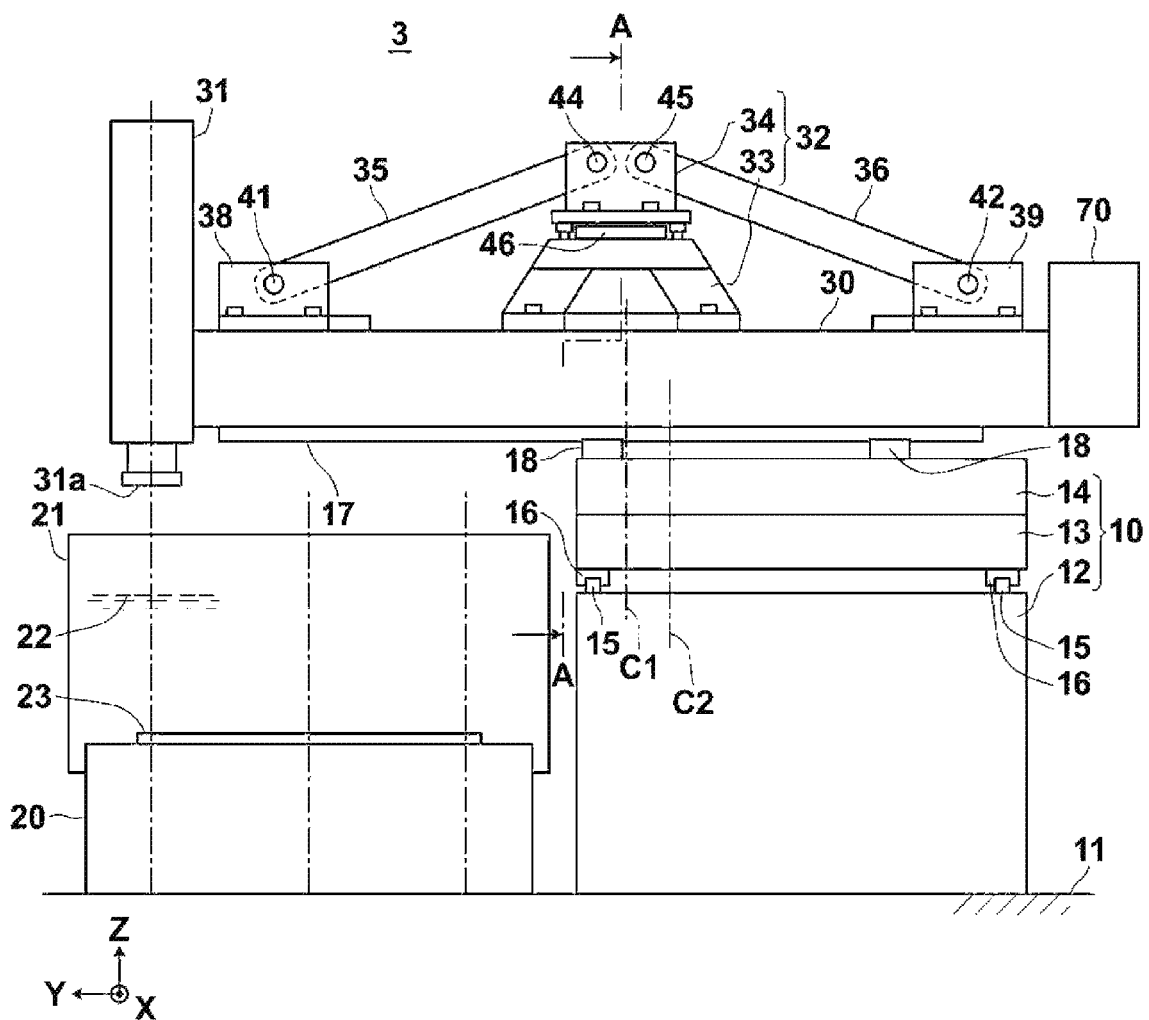
FIG. 15 is a side view showing the machine tool in FIG. 14.
Figure 16:
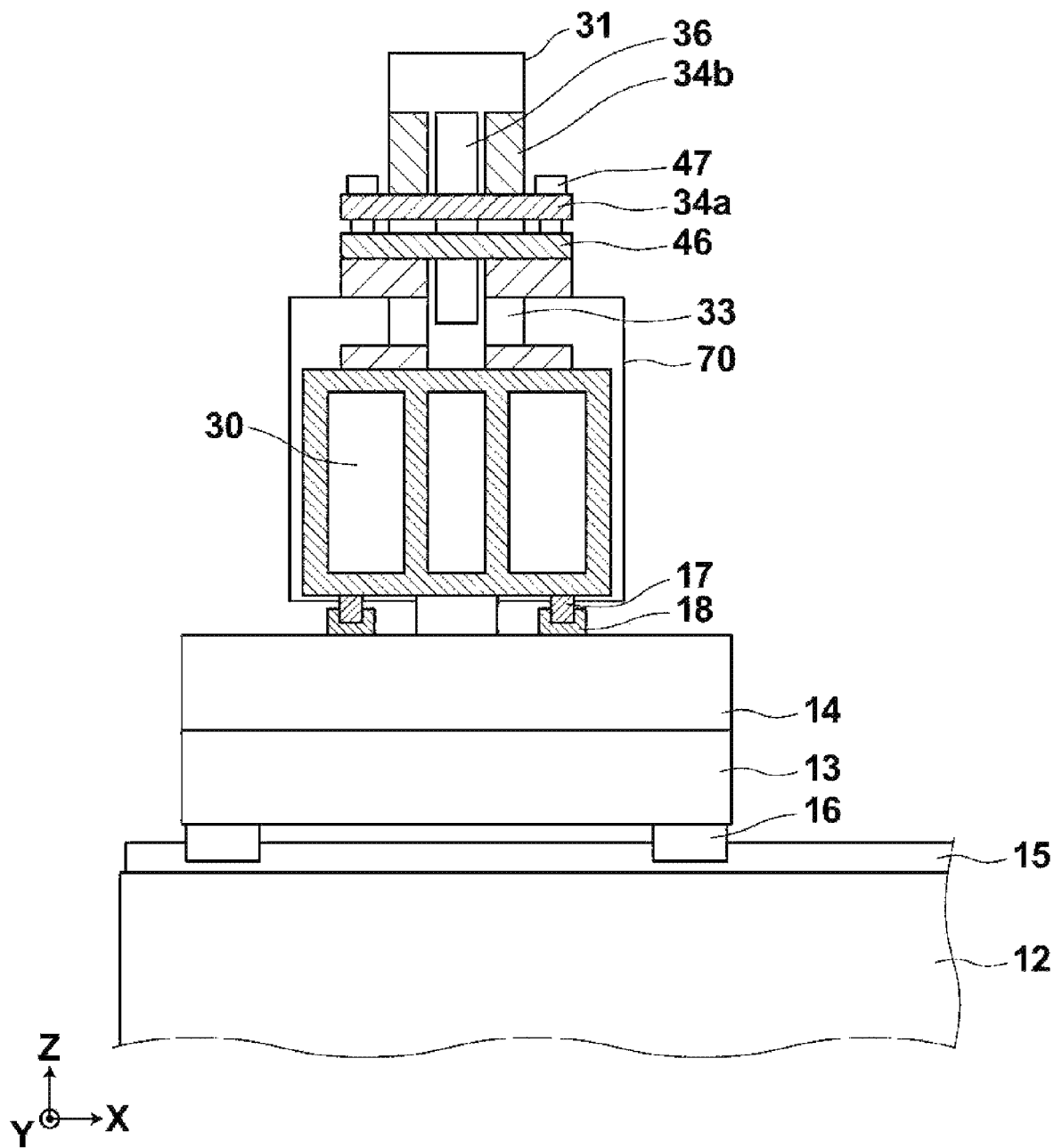
FIG. 16 is a front view partially showing the machine tool viewed along an A-A line in FIG. 15.

In the machine tool 3 of the embodiment, the ram 30 consisting of cast iron is also suspended and supported by a tower 32, a front arm 35 and a rear arm 36 which are made of steel. Besides, a configuration is employed in which a tension which acts to pull up connected parts of the ram 30 is applied to the front arm 35 and the rear arm 36. Thereby, a front end portion or a rear end portion of the ram 30 can be prevented from being deformed to bend downward. Particularly, in the embodiment, as shown in FIG. 15, the ram 30 can take a position where the ram 30 is greatly overhung with respect to a saddle 14. In this state, the front end portion of the ram 30 is deformed easily, and thus being able to prevent this deformation is very effective in improving precision of electric discharge processing. In addition, the machine tool 3 of the embodiment is not configured in a manner that the ram 30 itself has a particularly high rigidity, and thus the machine tool 3 can be configured to be small and light.

Figure 17:
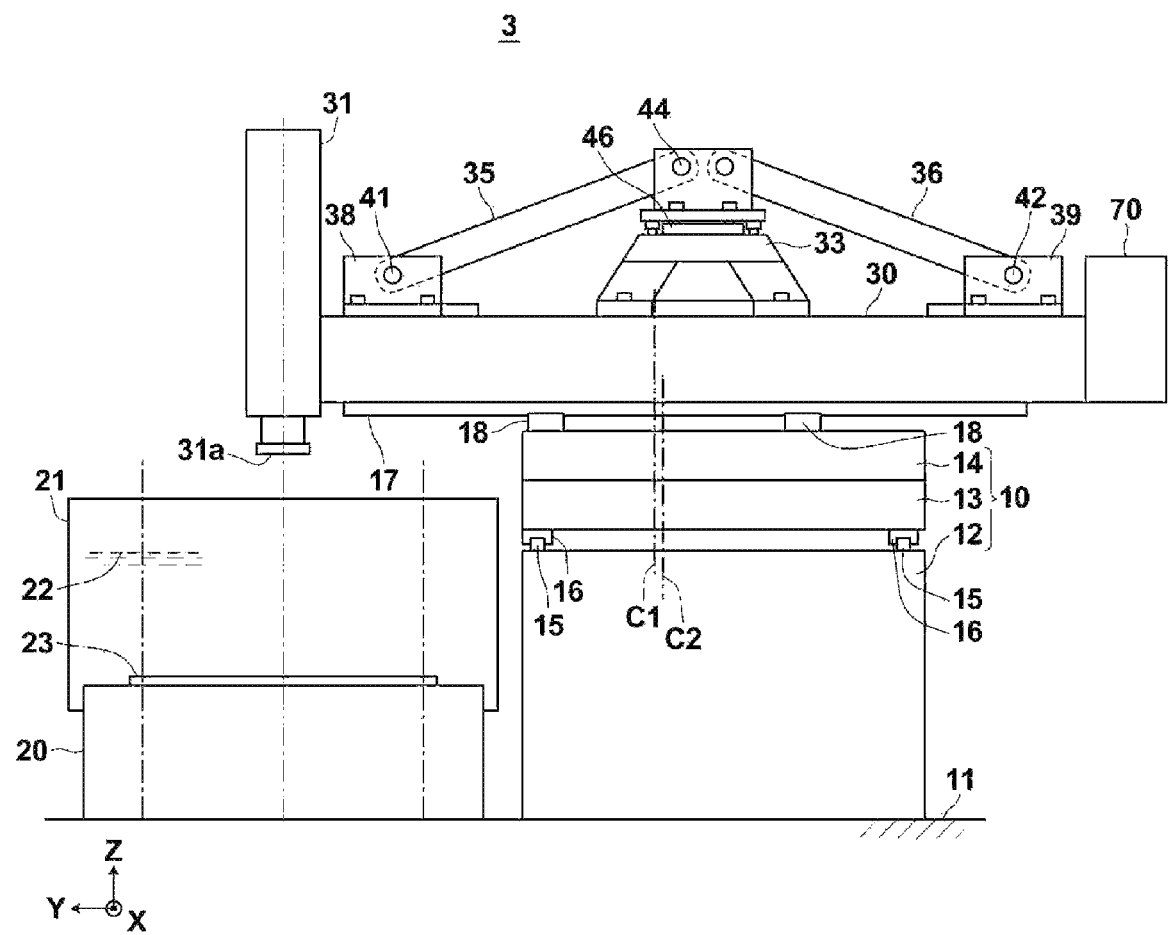
FIG. 17 is a side view showing the machine tool in FIG. 15 in which a ram is moved back to a center of a Y-axis travel distance.
Figure 18:
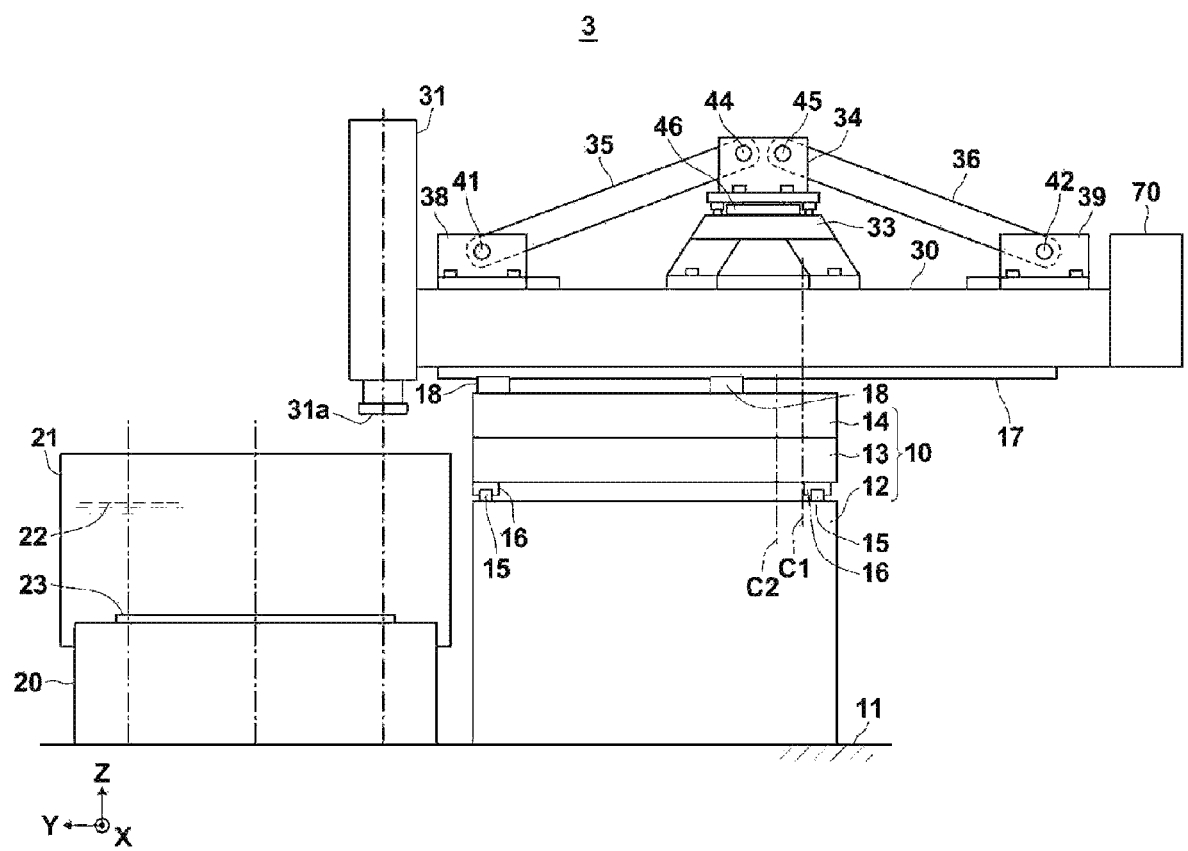
FIG. 18 is a side view showing the machine tool in FIG. 15 in which the ram is moved back to the farthest position in the Y-axis direction.

In the machine tool 3 of the embodiment, corresponding to the change of the position for electric discharge processing in a workpiece 23, the position of the ram 30 in the Y-axis direction with respect to a structural object 10, more specifically, with respect to the saddle 14, is changed sequentially as shown in FIG. 15, FIG. 17 and FIG. 18. If the ram 30 travels in the −Y direction, the balance weight 70 which is fixed to the ram 30 travels in the same way as the ram 30. Furthermore, in FIG. 15, FIG. 17 and FIG. 18, a position of the center of gravity in the Y-axis direction of a structure in which the balance weight 70 is excluded from an X-axis direction traveling body which applies load to rails 15 is indicated by a one-dot chain line C1. A position of the center of gravity in the Y-axis direction of the above X-axis direction traveling body is indicated by a one-dot chain line C2.

By fixing the balance weight 70 to the ram 30, compared with a case without the balance weight 70, the position of the center of gravity of the X-axis direction traveling body is positioned closer to the center than two traveling body supporting positions separated in the Y-axis direction, that is, positions between two rails 15. In this case, when the overhang of the ram 30 occurs, load applied to parts outside the two traveling body supporting positions is reduced, and the deformation of the ram 30 can be prevented.

The embodiment including the balance weights 65 configured to travel to a direction opposite to the travel direction of the ram 30 along with the travel of the ram 30 in the Y-axis direction, or the embodiment including the balance weight 70 fixed to the ram 30 is described, but the machine tool of the embodiments of the disclosure may not particularly include the balance weights 65 or the balance weight 70.

In addition, all the machine tools of the three embodiments described above are electric discharge machines, but the disclosure is not limited to electric discharge machines and can be applied to every machine tool including a ram extending in a longitudinal direction and being disposed horizontally.

What is claimed is:

1. A machine tool, comprising:
    a ram which extends in a longitudinal direction and is disposed horizontally;
    a processing head which is attached to a front surface of the ram;
    a tower which is connected to an upper surface of the ram in a state of upwardly standing at an intermediate position in the longitudinal direction of the ram and has an adjustable height;
    a front arm in which one end is connected to a front portion of the ram; and
    a rear arm in which one end is connected to a rear portion of the ram; wherein
    the tower comprises:
        a base portion which is fixed to the ram;
        an arm connection portion to which the other end of the front arm is connected and the other end of the rear arm is connected; and
        a jack-up bolt having a head arranged in a state of being in contact with one of the base portion and the arm connection portion in a vertical direction wherein the jack-up bolt is threadingly engaged to the other one of the base portion and the arm connection portion and pushes the arm connection portion upwardly by screwing or unscrewing.

2. The machine tool according to claim 1, further comprising a processing electrode which is attached to a lower end of the processing head.

3. The machine tool according to claim 1, further comprising a structural object which supports the ram so that the ram is capable of relatively traveling in a front-rear direction; and
a balance weight which is mounted on the ram.

4. The machine tool according to claim 3, wherein the structural object comprises a saddle configured to travel in an X-axis direction extending in a horizontal direction, and
the ram is attached to the saddle in a manner of traveling in a Y-axis direction extending in a horizontal direction orthogonal to the X-axis direction.

5. The machine tool according to claim 3, further comprising a balance weight driver configured to make the balance weight travel more backward as the ram travels more forward with respect to the structural object.

6. The machine tool according to claim 5, further comprising:
a pair of rotation members which is arranged clamping the ram;
a first shaft hole which is arranged in one of the ram and each rotation member of the pair of rotation members;
a first shaft which is arranged in the other one of the ram and the each rotation member of the pair of rotation members and is inserted into the first shaft hole;
a second shaft hole which is arranged in one of the ram and the each rotation member of the pair of rotation members; and
a second shaft which is arranged in the other one of the ram and the each rotation member of the pair of rotation members and is inserted into the second shaft hole; wherein
the balance weight driver comprises:
a pair of bearing portions which is arranged in the structural object;
a pair of pulleys which is respectively mounted on the pair of bearing portions;
an endless belt which wraps around the pair of pulleys;
a first connection portion which connects the endless belt and the pair of rotation members; and
a second connection portion which connects the endless belt and the balance weight.

7. The machine tool according to claim 6, wherein the first shaft hole or the first shaft is arranged at the intermediate position in the longitudinal direction of the ram; and
the second shaft hole or the second shaft is arranged at the front portion of the ram.

8. The machine tool according to claim 5, wherein the balance weight driver comprises:
a pair of bearing portions which is arranged in the structural object;
a pair of pulleys which is respectively mounted on the pair of bearing portions;
an endless belt which wraps around the pair of pulleys;
a first connection portion which connects the endless belt and the ram; and
a second connection portion which connects the endless belt and the balance weight.

9. The machine tool according to claim 3, wherein the balance weight is fixed to a rear end portion of the ram.

10. The machine tool according to claim 1, wherein the tower further comprises a spacer which is arranged between the arm connection portion and the base portion and contacts the arm connection portion and the base portion when a tension is applied.

11. The machine tool according to claim 1, wherein the front arm and the rear arm are configured by a material having a greater Young's modulus than a material configuring the ram.

* * * * *